(12) United States Patent
McClure

(10) Patent No.: US 6,688,988 B2
(45) Date of Patent: Feb. 10, 2004

(54) LOOKING THREAD COLD FORMING TOOL

(75) Inventor: Thomas W. McClure, Brookfield, WI (US)

(73) Assignee: Balax, Inc., North Lake, WI (US)

( * ) Notice: Subject to any disclaimer, the term of this patent is extended or adjusted under 35 U.S.C. 154(b) by 0 days.

(21) Appl. No.: 10/162,005

(22) Filed: Jun. 4, 2002

(65) Prior Publication Data

US 2003/0224864 A1 Dec. 4, 2003

(51) Int. Cl.[7] .................................................. B21J 13/02
(52) U.S. Cl. ........................ 470/198; 470/204; 408/220; 408/222
(58) Field of Search ................................ 470/198, 204; 408/215, 219, 220, 221, 222

(56) References Cited

U.S. PATENT DOCUMENTS

| | | |
|---|---|---|
| 793,824 A | 7/1905 | Culliney |
| 2,581,690 A | 1/1952 | Moehle et al. |
| 2,787,798 A * | 4/1957 | Rosan .................. 470/204 |
| 3,069,961 A | 12/1962 | Baubles |
| 3,220,032 A | 11/1965 | Van Vleet |
| 3,237,485 A | 3/1966 | Van Vleet |
| 3,469,491 A * | 9/1969 | Munsey .................. 411/422 |
| 3,561,171 A | 2/1971 | Van Vleet et al. |
| 3,653,241 A | 4/1972 | Orlomoski |
| 3,656,197 A | 4/1972 | Van Vleet |
| 3,882,917 A | 5/1975 | Orlomoski |
| 3,901,066 A | 8/1975 | Orlomoski |
| 4,023,914 A | 5/1977 | Holmes |
| 4,074,950 A | 2/1978 | Holmes |
| 4,527,299 A | 7/1985 | Bredal |
| 4,539,832 A | 9/1985 | Koller |
| 4,764,067 A | 8/1988 | Kawashima |
| 4,826,377 A | 5/1989 | Holmes |
| 5,035,019 A | 7/1991 | Dias |
| 5,318,393 A * | 6/1994 | Yamada .................. 408/222 |
| 5,797,710 A | 8/1998 | Sawabe et al. |
| 6,216,510 B1 | 4/2001 | Hashimoto |
| 6,217,267 B1 | 4/2001 | Sugano et al. |
| 6,514,148 B2 * | 2/2003 | Glimpel et al. .............. 470/204 |

FOREIGN PATENT DOCUMENTS

WO    WO 79/00280    5/1979

* cited by examiner

*Primary Examiner*—Ed Tolan
(74) *Attorney, Agent, or Firm*—Ryan Kromholz & Manion, S.C.

(57) ABSTRACT

A thread forming tap comprising a shank section, a body section extending longitudinally from the shank section, a helical thread formed on the body section having radially converging flank portions and an undercut ramp formed in at least one of said flank portions at a predetermined angle.

23 Claims, 3 Drawing Sheets

LOOKING THREAD COLD FORMING TOOL

BACKGROUND OF THE INVENTION

The present invention is generally directed toward thread forming taps and, more particularly, to a new and improved thread forming tap for use in providing a locking thread form on the interior of a suitable aperture, bore, etc. In the art of thread forming, material is actually displaced, or cold rolled to form a thread within the aperture, bore, etc. Toward this end, the tap of the present invention is adapted to form a specialized thread within such a bore having a crest profile that will produce a self-locking thread.

All cold formed or rolled threads have a cup or "U" in the thread crest due to the nature of the thread forming process. This is shown in FIG. 1 (Prior Art). The cup is labeled "U". The formation of each cup or "U" is the result of material being displaced to form the basic outline of a 60 degree included angle of a standard thread. A properly sized hole should result in a thread percentage of 65% to 75%. Tapping with too small of a pre-tap hole size produces a sharp thread form that results in excessive tapping torque, tap wear, and possible tap breakage. Tapping with too small of a pre-tap hole size results in a low thread percentage (i.e. 40%) and an after-tap minor diameter that is too big.

In the present invention, the cold forming tap produces a modified "U", such that at least one leg of the "U" acts as a spring. The unique profile of the tap, described infra, changes the geometry and location of the "U" or cup on the thread crest. The unique profile does not interfere or change the basic thread pitch and major and minor diameters that could interfere with the assembly of a mating thread.

SUMMARY OF THE INVENTION

The present invention comprises an improved tap having a shank section, a body section extending longitudinally from the shank section, and a helical thread formed on the body section. The helical thread has radially outwardly converging flanks defining the thread root and thread crest. At least one flank includes an undercut angle formed between the pitch diameter and the root diameter of the tap. The undercut angle displaces or changes the location of the cup or "U" along the crest of the thread formed in a workpiece. In its new position, at least one leg of the "U" is now positioned to interfere with the mating male thread of a fastener that is threaded within the workpiece opening. The interfering leg member acts a spring that is displaced when the male threaded fastener enters the opening. The spring exerts a predetermined force against the fastener thereby increasing the torque required to drive the fastener into the threaded opening. This also increases the torque required to remove the fastener. As such, the fastener is better retained within the threaded opening and will not loosen over time.

If the fastener is removed and then reinserted, the spring leg of the "U" shaped crest will again exert a force against the fastener thread.

It is accordingly a general object of the present invention to provide a new and improved tap for providing a locking thread form in a suitable aperture, bore, etc.

It is a more particular object of the present invention to provide a tap for forming threads on a female threaded member wherein the threads are provided with an offset cup adapted to lockingly engage the crest of the threads of the associated male threaded member such as a screw, bolt or the like.

It is still another object of the present invention to provide a new and improved tap of the above-described type that may be utilized to form threads of optimum locking characteristics commensurate with the material of the workpieces in which the threads are to be formed, length of thread engagement, installation torque requirements and/or reversal torque requirements.

Other objects and advantages of the present invention will become apparent from the following detailed description, taken in conjunction with the accompanying drawings.

DETAILED DESCRIPTION

Figure 1:
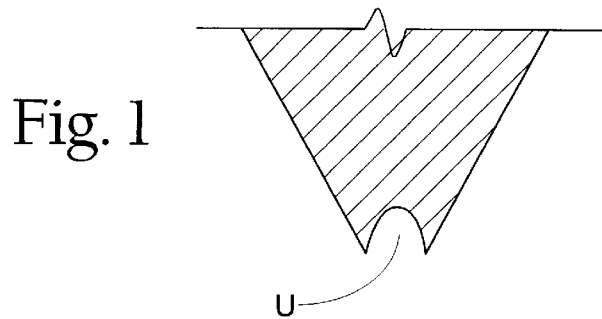
FIG. 1 is an exemplary fragmentary cross-sectional view of a standard cold rolled thread.
Figure 2:
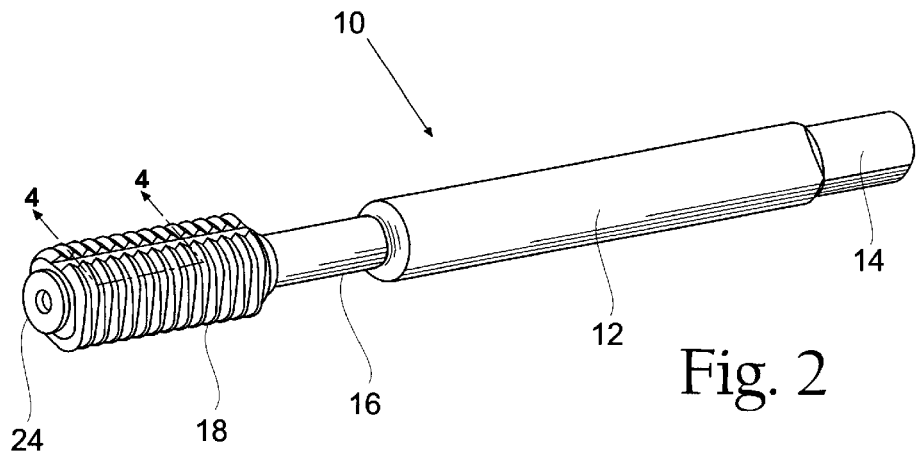
FIG. 2 is a perspective view of the thread forming tap of the present invention.
Figure 3:
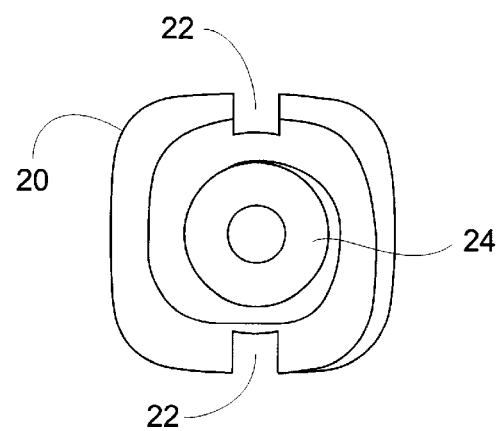
FIG. 3 is an enlarged side elevation view.

Referring now in detail to the drawings and in particular to FIG. 2 thereof, a helical thread forming tap, generally designated by the numeral 10, is shown as comprising a generally cylindrically-shaped shank section 12 having a tool-engaging end portion 14 at one end thereof. The central portion has a relief 16 formed therein. The opposite end of the shank section is provided with a tap body section 18 that is provided with cold form thread form producing lobes 20. A plurality of circumferentially spaced longitudinally extending vent grooves 22 are formed in the body section 18 and function generally as an area into which lubrication can flow during the thread forming process. Additionally, the vent grooves 22 serve to vent the bottom of blind holes to thereby prevent hydraulic locking and bottom blowout of weak bottomed blind holes. The forward (left) end of the tap 10 is provided with a slightly tapered or reduced diameter lead end portion or nose 24 of the cold forming lobes 20 for properly orienting the tap 10 within a suitable bore in which a thread is to be formed.

Figure 4:
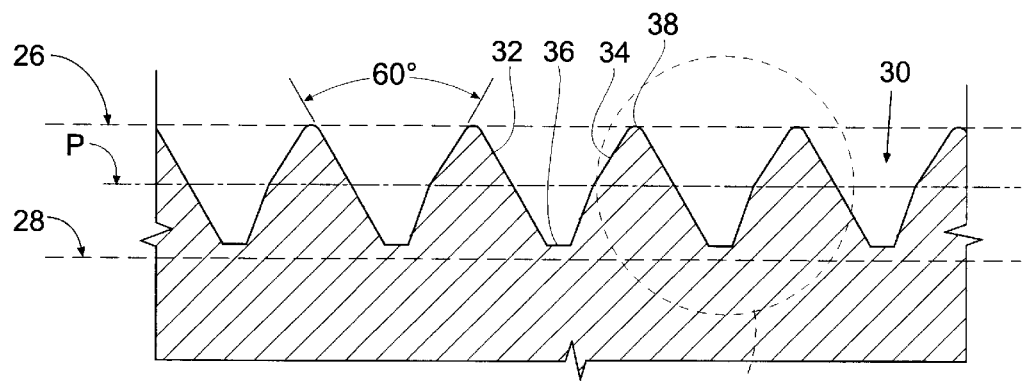
FIG. 4 is an enlarged fragmentary cross-sectional view taken substantially along the line 4—4 of FIG. 2.
Figure 5:
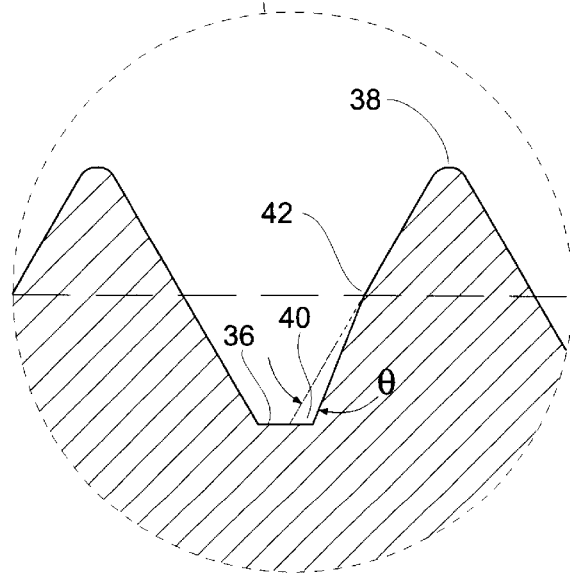
FIG. 5 is an enlarged view of the structure shown within the circle 5 of FIG. 4.

The thread forming lobes 20 comprise a helical thread 30 that, as best seen in FIGS. 4 and 5, has radially outwardly converging flanks 32 and 34 that define the thread root 36 and thread crest 38, respectively. In a unified American standard thread, the angle between flanks is 60 degrees. The line P represents the pitch line. A pair of pitch lines for a thread defines the pitch diameter or the diameter of an imaginary cylinder passing through the threads where the width of the thread and the width of the space between threads is the same. The major diameter is the largest diameter of the thread measured at 26. The minor diameter is the smallest diameter of the thread measured at 28.

In accordance with the principles of the present invention 10, at least one flank area 34 of the thread 30 is partially formed with an undercut ramp 40 that is arranged at a preselected angle theta ($\theta$) relative to the flank thread angle 34. More particularly, it has been found that optimum locking ability between the male and female threaded members can be adjusted to meet the specific application requirements (i.e. installation torque, reversal torque, etc.) when the angle theta (θ) is between 1 and 20 degrees measured from the traditional flank. The length of the undercut ramp can be varied above or below the pitch diameter point 42 to meet the locking criteria. A preferred application comprises the angle theta (θ) at approximately 10 degrees m and the undercut ramp extending from the pitch diameter.

It is to be noted that the undercut ramp 40 may be added to the pressure flank, non-pressure flank or both flanks. It is to be further noted that the aforesaid angle theta (θ) may vary with the degree of hardness of the material from which the workpiece is fabricated.

Figure 6:
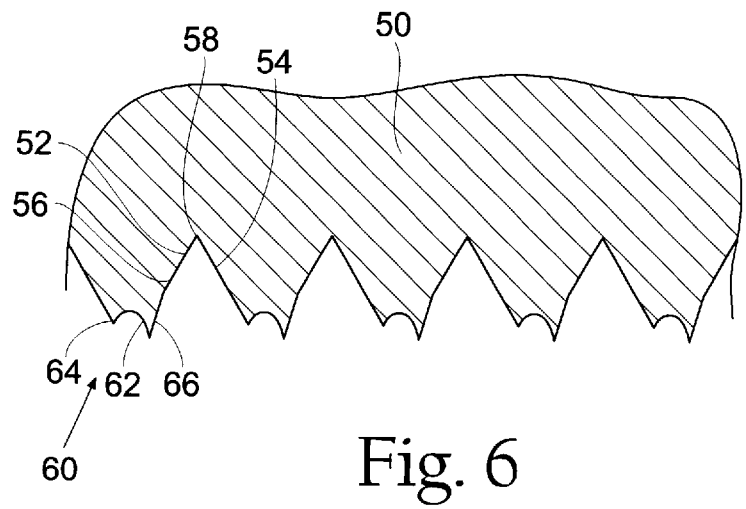
FIG. 6 is a fragmentary cross-sectional view of a threaded bore formed with the tap of the present invention.

FIG. 6 illustrates a typical workpiece 50 that is formed with a bore 52 having a thread form 54 provided by the tap 10. In particular, the thread form 54 consists of a helical thread 56 having a standard root area 58. As in all thread forming processes, a cup or "U" 62 is formed in the crest area 60. The "U" 62 has a pair of legs 64 and 66. Leg 66 extends beyond the standard thread profile and therefore will act as a spring lock when engaged with the threads of a mating fastener.

Figure 7:
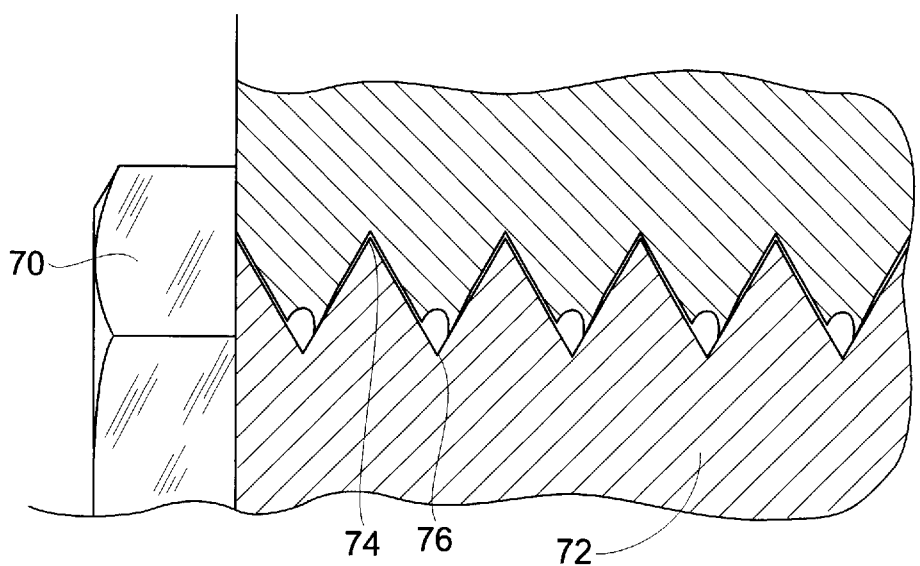
FIG. 7 is a fragmentary cross-sectional view of a threaded bore formed with the tap of the present invention and operatively associated with a typical male fastener.

FIG. 7 depicts a threaded bore 52 adapted to receive a suitable male threaded fastener 70 having a standard external thread 72 which define a helical crest area 74 and root area 76. When the threaded fastener 70 is threaded into the bore 52 in the position shown in FIG. 7, the flanks of the fastener 70 will make contact with the "U" leg spring lock 66 of the thread 50, thereby providing a substantial degree of contact between the respective threads and thereby creating a predetermined amount of friction between the threaded member 70 and the bore 52. As the length of engagement of the threaded member 70 increases, an increased amount of torsional force is applied and an even greater degree of contact will occur between the locking leg 66 and mating thread 72 until such time as the fastener 70 has been threaded to its predetermined position and/or torque within the workpiece 50. Based upon the contact between spring lock 66 and the thread 72, any relative lateral movement between the workpiece 50 and fastener 70 is positively prevented so as to assure against loosening thereof.

It should also be appreciated that the principles of the present invention as incorporated in the tap 10 could be equally applicable on thread rolling dies for providing locking thread forms on externally threaded members, such as the member 70.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A thread forming tool comprising:
   a body section having a helical thread formed thereon;
   said thread having radially converging flank portions, an undercut ramp area formed at the end of one of said flank portions arranged at a preselected angle to the thread and adapted to form a modified cup on the crest portion of the thread to be formed by the tool.

2. The thread forming tool of claim 1 wherein said body comprises an elongated member having said thread formed on the outer periphery thereof.

3. The thread forming tool of claim 1 wherein said body is formed with circumferentially spaced longitudinally extending vent areas.

4. The thread forming tool of claim 1 wherein the end of said body opposite said shank section is formed with a reduced diameter lead portion.

5. The thread forming tool of claim 1 wherein said ramp area is undercut at an angle between 1 degrees and 20 degrees.

6. The thread forming tool of claim 1 wherein said ramp area begins at a point approximating the pitch diameter of the thread.

7. The thread forming tool of claim 1 wherein said ramp area extends from a point approximating the pitch diameter of the thread to the minor diameter of the thread.

8. The thread forming tool of claim 1 wherein said ramp area extends from a point greater than the pitch diameter of the thread to the minor diameter of the thread.

9. The thread forming tool of claim 1 where in said modified cup comprises:
   a generally U-shaped formation on the crest portion of said thread, said U-shaped formation having a first leg and a second leg;
   said second leg extending further than said first leg.

10. The thread forming tool of claim 9 wherein said second leg is further adapted to act as a spring.

11. A thread forming tap comprising:
    a shank section;
    a body section extending longitudinally from the shank section;
    a helical thread formed on the body section and having radially converging flank portions, an undercut ramp area formed at the end of one of said flank portions and arranged at a preselected angle to said flank portion;
    said undercut ramp adapted to form a modified cup at the crest of the thread to be formed by the tap.

12. The thread forming tap of claim 11 wherein said body is formed with circumferentially spaced longitudinally extending vent areas.

13. The thread forming tap of claim 11 wherein the end of said body opposite said shank section is formed with a reduced diameter lead portion.

14. The thread forming tap of claim 11 wherein said preselected angle is between 1 degree and 20 degrees.

15. The thread forming tap of claim 11 wherein said ramp area begins at a point approximating the pitch diameter of the thread.

16. The thread forming tap of claim 11 wherein said ramp area extends from a point approximating the pitch diameter of the thread to the minor diameter of the thread.

17. The thread forming tap of claim 11 wherein said ramp area extends from a point less than the pitch diameter of the thread to the minor diameter of the thread.

18. The thread forming tap of claim 11 where in said modified cup comprises:
    a generally U-shaped formation on the crest portion of said thread, said U-shaped formation having a first leg and a second leg;
    said second leg extending further than said first leg.

19. The thread forming tap of claim 18 wherein said second leg is further adapted to act as a spring.

20. A thread forming tool comprising:
    a shank section;
    a body section extending longitudinally from the shank section;

a helical thread formed on the body section and having radially converging flank portions, an undercut ramp area formed at a point less than the pitch diameter of the flank portion thread and extending toward the thread root diameter;

said undercut ramp arranged at a preselected angle to said flank portion and adapted to form a modified cup at the crest of the thread to be formed by the tap.

21. The thread forming tool of claim 20 wherein the preselected angle is between 1 degree and 20 degrees.

22. The thread forming tool of claim 20 where in said modified cup comprises:

a generally U-shaped formation on the crest portion of said thread, said U-shaped formation having a first leg and a second leg;

said second leg extending further than said first leg.

23. The thread forming tool of claim 22 wherein said second leg is further adapted to act as a spring.

* * * * *

UNITED STATES PATENT AND TRADEMARK OFFICE
CERTIFICATE OF CORRECTION

PATENT NO. : 6,688,988 B2
DATED : February 10, 2004
INVENTOR(S) : Thomas W. McClure It is certified that error appears in the above-identified patent and that said Letters Patent is hereby corrected as shown below:

<u>Title page, Item [54] and Column 1, line 1,</u>
Title, delete "LOOKING" and insert -- LOCKING --

Signed and Sealed this

Twentieth Day of April, 2004

JON W. DUDAS
*Acting Director of the United States Patent and Trademark Office*